United States Patent [19]

Akin, Jr.

[11] Patent Number: 4,950,064

[45] Date of Patent: Aug. 21, 1990

[54] CARBON FIBER RIFLESCOPE HOUSING

[75] Inventor: Alfred A. Akin, Jr., Guina, Calif.

[73] Assignee: Bausch & Lomb Incorporated, Rochester, N.Y.

[21] Appl. No.: 290,969

[22] Filed: Dec. 28, 1988

[51] Int. Cl.$^5$ .................. G02B 7/02; G02B 23/16; B23B 7/14
[52] U.S. Cl. .................. 350/574; 350/319; 156/171; 156/184; 264/257
[58] Field of Search ............ 350/574, 319, 254, 255, 350/257; 156/162, 171, 184; 273/DIG. 23

[56] References Cited

U.S. PATENT DOCUMENTS

| | | | |
|---|---|---|---|
| 3,970,495 | 7/1976 | Ashton et al. | 156/162 |
| 4,089,991 | 2/1989 | Arai et al. | 350/255 |
| 4,092,453 | 5/1978 | Jonda | 273/DIG. 23 |
| 4,660,953 | 4/1987 | Fuchi et al. | 350/257 |
| 4,823,424 | 5/1989 | Arai et al. | 350/255 |

Primary Examiner—Jon W. Henry
Attorney, Agent, or Firm—John S. Norton

[57] ABSTRACT

A riflescope is disclosed which is manufactured from impregnated carbon fibers so as to be light weight, exceedingly strong and have essentially a zero coefficient of thermal expansion.

1 Claim, 2 Drawing Sheets

U.S. Patent  Aug. 21, 1990  Sheet 1 of 2  4,950,064
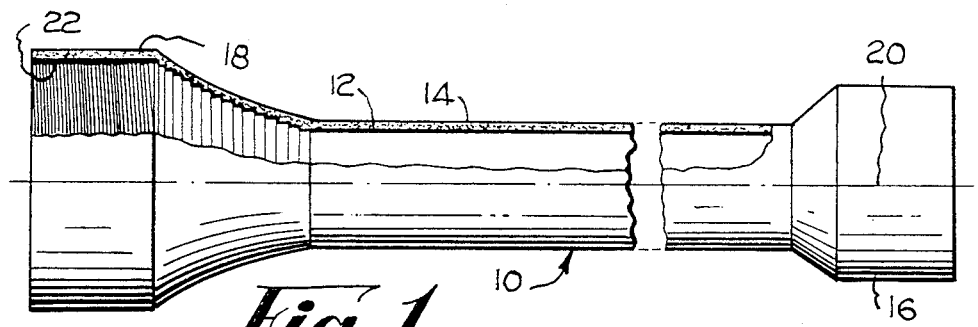
Fig. 1
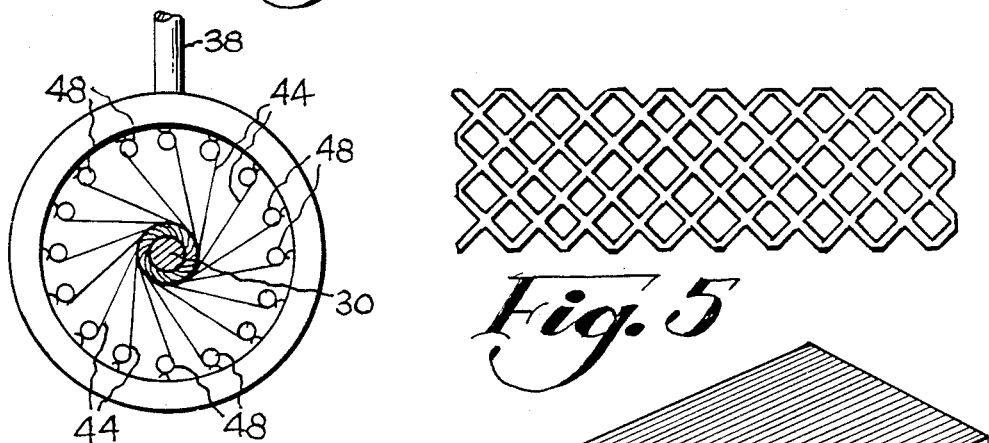
Fig. 3
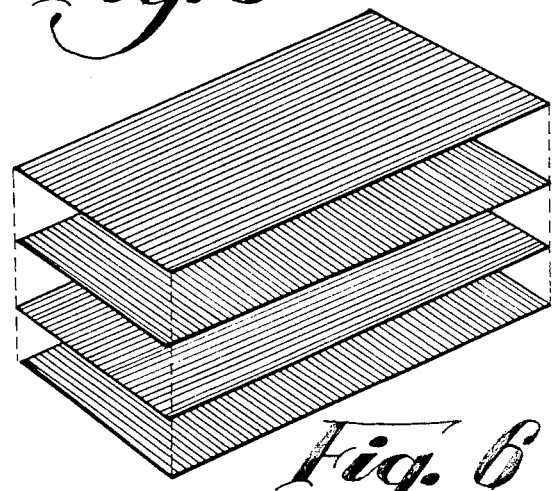
Fig. 5
Fig. 4
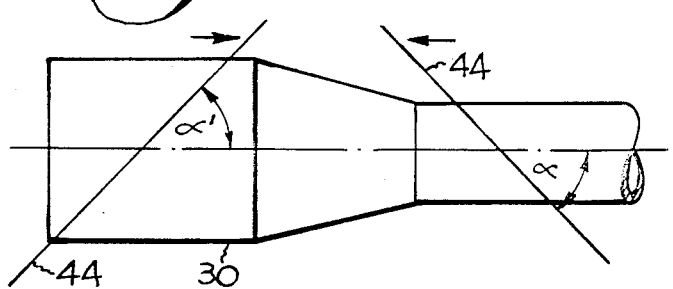
Fig. 6

CARBON FIBER RIFLESCOPE HOUSING

BACKGROUND OF THE INVENTION

1. Field of the Invention

This invention relates to a housing for a riflescope and particularly a riflescope housing which is constructed of a carbon fiber material.

2. Description of the Prior Art

In the past, riflescope housings, mainly have been constructed of various aluminum alloys with some being constructed of steel. This material has been nearly universally adopted as the material of choice as it offers several desirable features. First, alloyed aluminum is easily machined which is of significant value considering the amount of machining required to produce a riflescope housing. Second, aluminum is generally considered to be light weight, yet offers substantial strength. And lastly, aluminum may be treated to resist corrosion and weathering and also to impart color to the surface.

Accordingly, for the reasons set forth above, aluminum alloy has become the standard of the industry when selecting a material for use as a riflescope housing. These materials are chosen because of their machinability, extrudability, acceptable tensile strength ratings and ability to accept anodization treatment.

However, even in view of the advantages cited for the use of aluminum in the construction of riflescope housings, there exist several distinct problem areas which, up until the riflescope of the present invention, have yet to be addressed. For example, although aluminum is easily machined, the machining process itself can be quite costly. Also, aluminum must be treated, such as by anodization, to provide corrosion resistance and color to the material. This treatment adds further to cost. Further, and quite importantly, aluminum alloys are subject to changes in environmental conditions. That is, their coefficient of thermal expansion is such that the material either contracts or expands as the ambient temperature changes. Obviously, this factor can present a substantial problem for a hunter who may encounter rather drastic changes in temperature while pursuing his hobby. For example, the hunter may be leaving the confines of a hunting cabin where the temperature would be, perhaps, 65°-75° C. and entering the outdoor hunting environment where the temperature commonly falls below freezing, and in many instances well below freezing. This drastic change in temperature has a causal effect on the integrity of the optics mounted within the riflescope housing even if the optics are mounted in a material similar to the riflescope housing. This is so because the housing would be effected by the temperature change and caused to contract well before the internal mounts holding the optics. The movement of the materials with respect to each other many times causes the optics to lose collimation which is a serious problem with any sports optics device. Additionally, the relative movement of dissimilar materials may result in binding of the power change mechanism in adjustable focus riflescopes.

The problem is even further exacerbated when going from a cold environment to a warm environment. In this instance, the housing expands much more rapidly than the internally mounted optics, and as such the optics become loose and are essentially able to move within the scope housing. In some instances, this can be evidenced by a rattling sound and later by the previously referenced loss of collimation of the light rays passing through the optics of the instrument.

The above-referenced problem is still further complicated when dissimilar materials are utilized in the construction of the riflescope. As more dissimilar materials are used in construction, the various differences in thermal coefficients of expansion of the materials have a greater effect on the performance of the device.

A further consideration is the strength factor of the chosen aluminum alloy. Generally, aluminum alloys are chosen from either the 5000 or 6000 Series of alloys whose specifications and performance factors were defined by the ASTM. Some commonly used aluminum alloys include 5045T5, 6061T6 and 6063T6. The tensile strength of the alloys ranges from about 30,000 P.S.I. to 40,000 P.S.I., dependent upon choice. Other alloys are available which have much greater tensile strength ratings, but these materials are not used because of problems encountered in manufacturing and application of surface treatments.

Therefore, most riflescope housings manufactured today are of aluminum alloys which afford very low tensile strengths when compared to other known materials. As such, the housings are readily damaged by incidents which occur on a frequent basis in the hunting environment. As an example, it is not uncommon for a rifle bearing the scope to be dropped or knocked over. Many times such accidents render the scope unusable because of physical damage to the housing which, in turn, effects the scope's optical accuracy.

Composite and plastic materials also have been used for the manufacture of sports optics instruments, such as binoculars, as is evidenced by U.S. Pat. Nos. 3,531,177; 4,056,303 and 4,436,386. However, these materials offer very little strength, and in fact are considerably weaker than aluminum alloys or steel. Consequently, they are rarely, if ever, used for riflescopes.

Tubular members which are manufactured from materials other than steels or aluminum alloys have, of course, been known for some time. However, such tubular members are found in areas very diverse from the sphere which includes riflescopes and sports optics. For example, tubular housings constructed of, plastics, fiberglass and carbon fiber have been known. Uses for such tubes may vary from drivershafts for the automotive and trucking industry to enclosures and holders for fuses used in commercial wiring applications. However, as stated, the application is quite far removed from the sports optics field. An example of a composite tubular member constructed of filaments may be seen in U.S. Pat. No. 3,970,495. Other examples of composite tubular members may be seen in U.S. Pat. Nos. 3,414,960; 4,039,006; 4,047,731; 4,089,190; 4,157,181; 4,171,626; 4,173,128; 4,248,062; 4,301,201; 4,469,138; 4,605,385 and 4,657,795.

From the above, it is obvious that there is a strong need and desire to have provided a riflescope which is strong, yet light weight; easily manufactured from available materials and relatively unaffected by changes in climatic conditions.

The primary purposes of the present invention, as set forth and described in detail hereinafter, are to provide such a riflescope.

SUMMARY OF THE INVENTION

In accordance with the features of the present invention, a riflescope housing is provided which is constructed of a carbon fiber material which affords substantial strength to the housing, has a nearly zero thermal coefficient of expansion, is extremely light in weight, easily manufactured by any one of several different techniques and readily provided with surface color.

BRIEF DESCRIPTION OF THE DRAWINGS

FIG. 1 is a partially sectioned side view of a carbon fiber riflescope housing according to the principles of my invention;

FIG. 3 is a sectional view taken along line 3—3 of FIG. 2;

FIG. 4 is a schematic side view of the riflescope housing showing the angles of wind of the carbon fibers;

FIG. 5 is a rear view of a woven carbon fiber sock; and

FIG. 6 is a perspective view showing a plurality of carbon fiber sheets.

DETAILED DESCRIPTION OF THE PREFERRED EMBODIMENT

Figure 2:
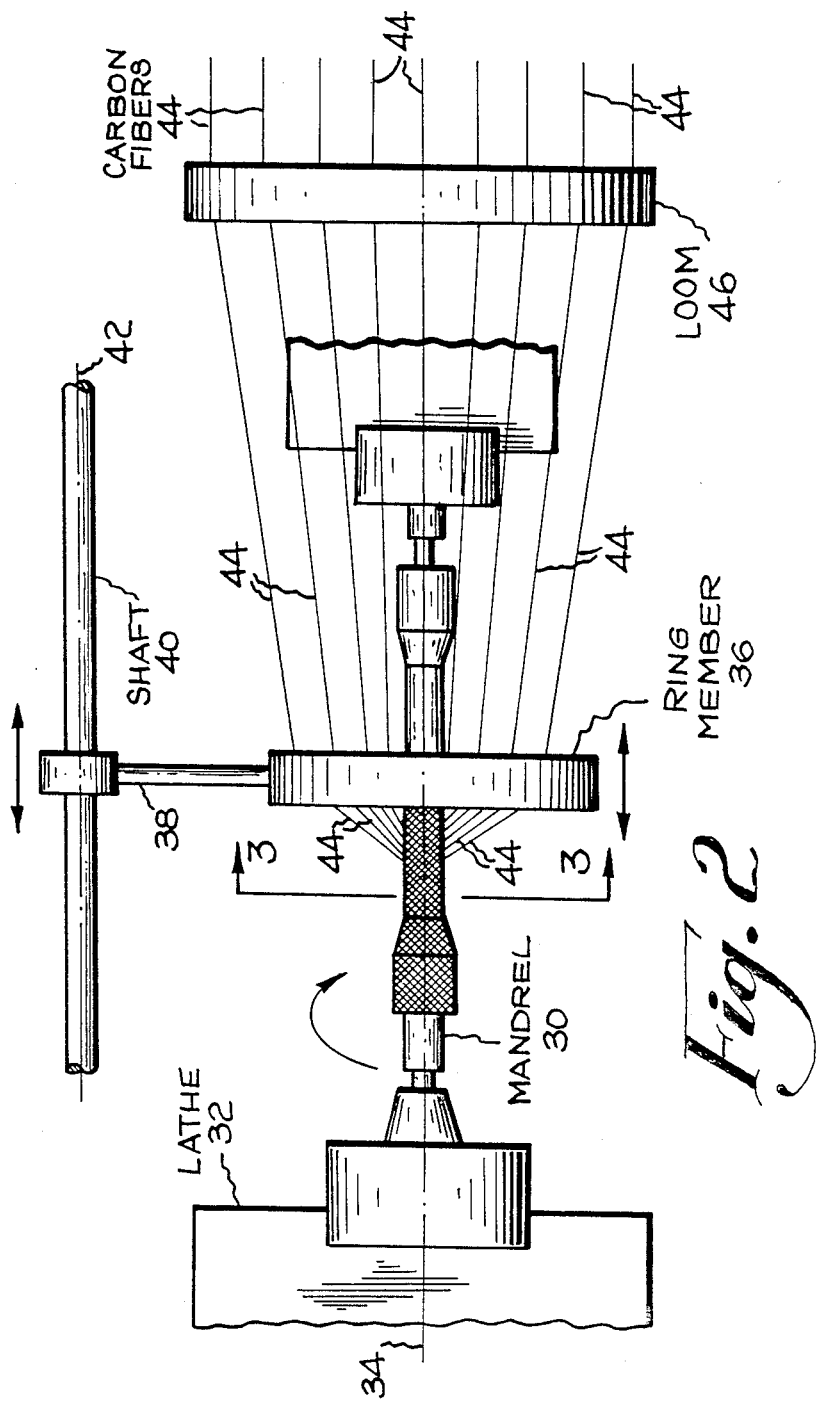
FIG. 2 is a schematic top view depicting the construction of a riflescope housing according to my invention.

As shown in FIG. 1, a riflescope housing 10 is depicted which has been constructed of a carbon fiber material 12. The housing 10 generally comprises a body tube 14 which in almost all instances in the U.S. is approximately one inch in diameter. At one end of the body tube 14 is an eyepiece section 16 while at the opposite end is an objective bell 18. As is evident, the eyepiece section 16 is designed to receive and accurately hold in optical alignment along axis 20 appropriate optics which function as the eyepiece. The objective bell is designed so as to securely and accurately hold in optical alignment along axis 20 appropriate optics which function as an objective. The objective optics may be fixed in a cell member (not shown) which is threadably received by threaded portions 22 formed on the internal surface of the objective bell 18.

In a preferred embodiment as shown in FIG. 2 a mandrel 30 is prepared, such as by normal machining procedures, which exactly matches the internal dimensions of the desired riflescope. The mandrel 30 is suitably mounted to a lathe 32 for rotation about an axis 34, which axis coincides with the axis of mandrel 30.

A ring-like member 36, as illustrated in FIG. 3, is fitted over the mandrel 30 and affixed to a support fixture 38 which is in turn mounted to suitable apparatus 40 whose axis 42 is parallel to axis 34.

A multiplicity of carbon fibers 44, such as are available from Celion ® Carbon Fibers of Charlotte, N.C., and referred to as G30-500, are fed from reels (not shown) upon which they are individually wound through a loom device 46 and ring-like member 36 where they are appropriately secured to the mandrel 30. As shown in FIG. 3, the ring-like member 36 includes a plurality of eyelets 48 through which the individual carbon fibers 44 are fed.

Upon energization of the lathe 32, the mounted mandrel 30 is caused to rotate about axis 34. Simultaneously, the ring-like member 36 is driven axially at a predetermined rate along the axis 42. The carbon fibers 44, as stated earlier, are secured to mandrel 30. Thus, upon rotation of the mandrel 30 and simultaneous linear movement of ring-like member 36, the carbon fibers are caused to be wound upon the mandrel 30. It will be appreciated that the angle at which the carbon fibers 44 are wound on the mandrel is a function of the RPM's at which the lathe is driven and the speed the ring-like member 36 is translated over the mandrel 30.

As shown in FIG. 4, the angle $\alpha$ represents the angle at which the carbon fibers 44 are wound upon the mandrel 30. However, it will be appreciated that in order to assure greater strength and durability, more than one layer of carbon fibers 44 need be wound. This is easily accomplished by controlling the direction of travel of the ring-like member 36. That is, as the ring-like member 36 reaches one end of the mandrel 30, its direction is reversed causing it to move back over the mandrel. Upon reaching the opposite end of the mandrel the direction is again reversed. In this manner, any number of layers of carbon fibers 44 can be wound. As the rotation of the lathe and the speed at which the ring-like member is translated remain the same, the angle $\alpha$ at which the carbon fibers are wound remains the same regardless of direction.

It will, of course, be understood that the carbon fibers 44 need to be impregnated with an activating agent which causes the bonding together of the carbon fibers resulting in an extremely strong yet light weight homogenous unit. In this application the activating agent is applied to the carbon fibers 44 as they are fed from their individual reels upon which they are wrapped. The typical tensile strength of impregnated G30-500 carbon fibers is approximately $550 \times 10^3$ psi. The resulting tubular housing is outstandingly strong when any comparison is made to previous riflescope housings.

After the wrapped mandrel is allowed to cure, it is removed from the lathe and separated from the now sufficiently hardened carbon fiber housing. The few remaining finishing steps which are required may now be accomplished. As the carbon fibers are, as supplied, black, the resulting housing is similarly black which is the overwhelming choice of color for such housings. Therefore, the surface treatment and coloring steps need not be scheduled.

In an alternate mode of construction, male and female molds can be manufactured which, when assembled, have a cavity the exact size and shape of the desired riflescope housing. A tubular woven sock-like member of carbon fibers, such as is schematically shown in FIG. 5, is fitted over the male portion of the mold. Thereafter, the female portion is assembled to encompass the sock-like member and the male portion. The resultant mold is capped at its ends and an activating and setting agent is fed under pressure into the mold cavity. The agent surrounds the carbon fiber sock-like member and fills the cavity. At this time resulting mold is cured for the prescribed period of time and the halves then separate. The finished product has incorporated the strength of the carbon fibers while featuring light weight and superior surface finish.

A still further method of construction would involve the utilization of thin sheets of material which have multiple strands of carbon fibers, each disposed in parallel alignment to adjacent fibers as shown in FIG. 6. As in the first mode of construction described, a mandrel is provided which is dimensioned to reflect the internal parameters of the desired riflescope. A sheet of the carbon fiber material activated with a setting agent is wrapped around the mandrel. The material is wrapped such that the carbon fibers are angularly disposed at, for instance, 45° to the longitudinal axis of the mandrel.

Thereafter, a second sheet of material is wrapped about the first sheet such that the carbon fibers are also disposed at 45° to the longitudinal axis but opposite the angle of the first wrap. That is, the carbon fibers of the second wrap are arranged to that they criss-cross the fibers of the first wrap. Of course, the number of wraps applied is determined by many variables, but it is anticipated several will be applied.

It will be recognized that certain embodiments of the present invention have been shown and described in detail. However, it also will be recognized that other variations may be devised which do not depart from the spirit and scope intended by this invention and as set forth in the following claims.

I claim:

1. In a riflescope housing having a plurality of optical lenses disposed along an optical axis, the improvement comprising a tubular housing constructed of a plurality of angularly overlapping carbon fibers impregnated with an activating agent, said carbon fiber tubular housing having a coefficient of thermal expansion which is nearly zero over the entire range of temperatures to which a riflescope would be normally exposed whereby the optical characteristics of the riflescope remain unaffected by changes in climatic conditions.

* * * * *